US008790587B2

(12) United States Patent
Singh et al.

(10) Patent No.: US 8,790,587 B2
(45) Date of Patent: Jul. 29, 2014

(54) COMPOSITIONS, METHODS AND DEVICES FOR CONTROL AND CLEAN-UP OF HAZARDOUS SPILLS

(71) Applicant: Honeywell International, Inc., Morristown, NJ (US)

(72) Inventors: Rajiv R. Singh, Getzville, NY (US); Ian Shankland, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/938,606

(22) Filed: Jul. 10, 2013

(65) Prior Publication Data

US 2013/0302218 A1    Nov. 14, 2013

Related U.S. Application Data

(62) Division of application No. 13/648,219, filed on Oct. 9, 2012, now abandoned, which is a division of application No. 12/132,764, filed on Jun. 4, 2008, now Pat. No. 8,309,034.

(60) Provisional application No. 60/943,044, filed on Jun. 9, 2007, provisional application No. 60/643,447, filed on Jun. 12, 2007.

(51) Int. Cl.
 *B01J 19/06* (2006.01)
(52) U.S. Cl.
 CPC ........................................ *B01J 19/06* (2013.01)
 USPC .......................................... 422/291; 252/190

(58) Field of Classification Search
 CPC ........................................................ B01J 19/06
 USPC ........ 422/291; 252/190; 588/300, 249.5, 252, 588/406
 See application file for complete search history.

(56) References Cited

U.S. PATENT DOCUMENTS

| 4,383,868 A | 5/1983 | Braley |
| 4,865,761 A | 9/1989 | Mandel et al. |
| 5,437,230 A | 8/1995 | Harris et al. |
| 5,632,966 A | 5/1997 | Van Der Puy et al. |
| 5,885,602 A | 3/1999 | Levy |
| 6,116,049 A | 9/2000 | Filipczak |
| 6,177,058 B1 | 1/2001 | Singh et al. |
| 6,854,374 B1 | 2/2005 | Breazeale |
| 7,143,833 B2 | 12/2006 | Gaidano et al. |

FOREIGN PATENT DOCUMENTS

| WO | WO 97/32810 | 9/1997 |
| WO | WO 00/78448 | 12/2000 |

OTHER PUBLICATIONS

Creasorb, Technical Information, Jan. 2005.

*Primary Examiner* — Sean E Conley
(74) *Attorney, Agent, or Firm* — Faegre Baker Daniels LLP

(57) ABSTRACT

Disclosed are methods for treating hazardous materials, such as those which result from an unwanted spill or leak, which comprise one or more of the steps or effects of: neutralizing the dispersed material; solidifying the dispersed material; immobilizing the material; and/or reducing the evolution of harmful or unwanted gaseous forms from the spillage, preferably using a binding agent which comprises a polyacrylate-polyacrylamide cross-linked copolymer.

12 Claims, 4 Drawing Sheets

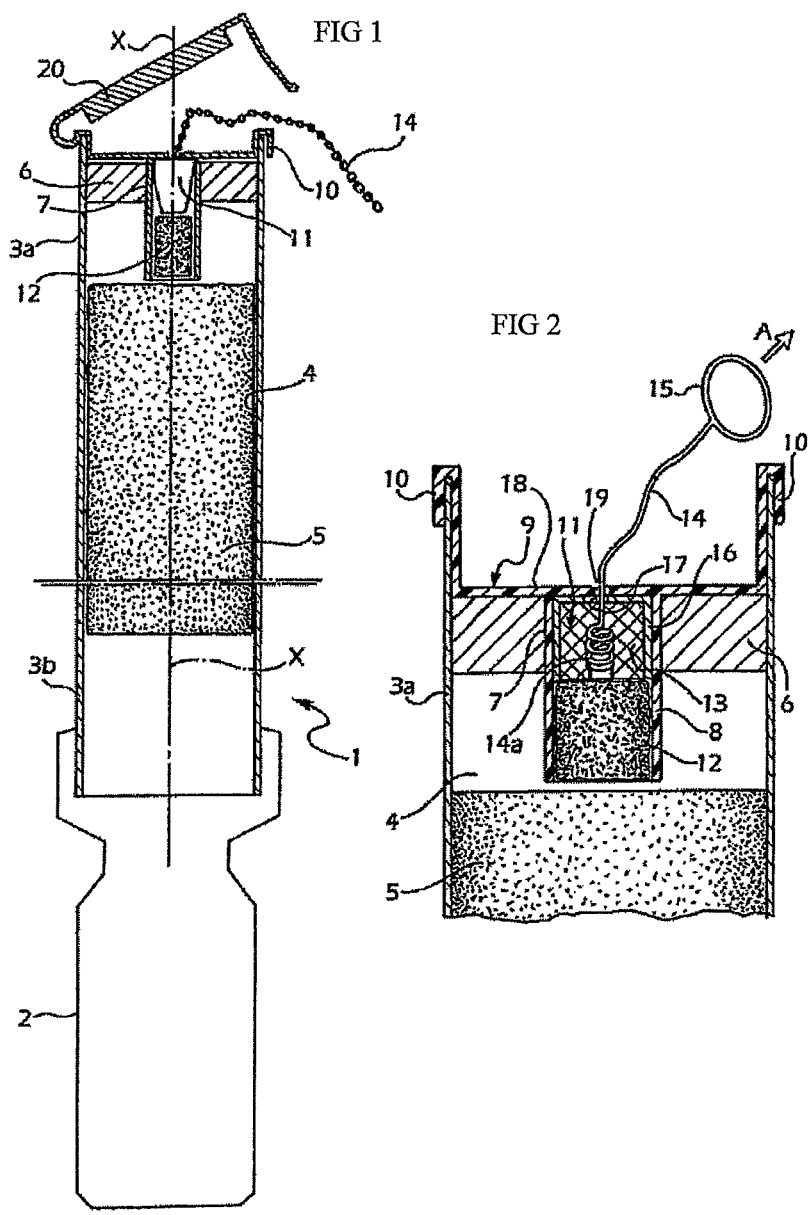

ic acid. The method disclosed in this patent involves the application to a spill of a solid particulate mixture containing

COMPOSITIONS, METHODS AND DEVICES FOR CONTROL AND CLEAN-UP OF HAZARDOUS SPILLS

CROSS REFERENCE TO RELATED APPLICATIONS

The present application is a divisional of, and thus claims priority under 35 U.S.C. §120 to, U.S. patent application Ser. No. 13/648,219, filed on Oct. 9, 2012, which is a divisional of, and thus claims priority under 35 U.S.C. §120 to, U.S. patent application Ser. No. 12/132,764, filed on Jun. 4, 2008, which claims priority under 35 U.S.C. §119(e) to U.S. Provisional Application No. 60/943,044, filed on Jun. 9, 2007, and to U.S. Provisional Application No. 60/943,447, filed on Jun. 12, 2007. U.S. patent application Ser. Nos. 13/648,219 and 12/132,764, and U.S. Provisional Application Nos. 60/943,044 and 60/943,447 are incorporated herein by reference.

BACKGROUND

1. Field of Invention

The present invention relates to compositions, methods, and devices for containment, mitigation, neutralization and/or clean-up of unwanted dispersals of hazardous material, particularly spills of acidic materials such as hydrogen fluoride-containing compositions.

2. Description of Related Art

Hydrogen fluoride is a well known compound that is used in industry in a variety of processes including in alkylation reactions as a catalyst, in fluorination reactions as a fluorinating agent, in the manufacture of fluorides, in the separation of uranium isotopes, and in the production of fluorine containing plastics. It is well known that hydrogen fluoride is a volatile, extremely hazardous substance. Moreover, the high vapor pressure of hydrogen fluoride renders it readily aerosolizable.

Various compositions and methods have been known to be useful for the clean-up of hazardous materials, particularly acid-containing materials, and more particularly materials which contain hydrogen fluoride. However, many of these compositions and methods have certain disadvantages.

U.S. Pat. No. 4,383,868—Braley relates to a method of treatment of spillages of hazardous chemicals in a liquid form, and in particular to a method of treatment of such spillages for controlling and clean-up of a spill of hydrofluoric acid. The method disclosed in this patent involves the application to a spill of a solid particulate mixture containing both polyacrylamide and a polymer or copolymer of an alkyl (alk)acrylate. The material is said to immobilize the spillage and reduce the evolution of fumes from the spillage, and is said to be more effective in the treatment of spillages of many hazardous liquid chemicals than is either the polyacrylamide or the polyalkyl(alk)acrylate when used alone. The U.S. Pat. No. 4,383,868 indicates that the polymer or copolymer of the alkyl(alk)acrylate may be a polymer derived from one or more alkyl(alk)acrylates, e.g. methyl acrylate, ethyl acrylate, methyl methacrylate, butyl methacrylate or ethyl methacrylate, or it may be a copolymer of a substantial proportion of units derived from one or more alkyl(alk)acrylates, e.g. at least 80 mole %, and units derived from one or more ethylenically unsaturated monomers copolymerisable therewith. The patent teaches that the amount of polymer or copolymer of the alkyl(alk)acrylate should not be present in the composition in an amount that is greater than 80% by weight of the particulate mixture used in the treatment of hazardous chemicals.

U.S. Pat. No. 4,865,761—Mandel et al. relates to methods and compositions for neutralizing and solidifying hazardous organic spills. The disclosed composition, in addition to optional ingredients, contains about 5 to 30% of absorptive clay and about 10 to 50% portland cement. Such compositions and methods have the disadvantages of being relatively heavy to transport to the site of the hazardous spill as well as the difficulty associated with cleanup and/or recovery of the hazardous material once it is neutralized and absorbed into the disclosed composition.

While prior methods may have achieved some degree of success, applicants believe that several disadvantages exist and that there is a need for better methods, devices and compositions. For example, applicants believe that a need continues to exist for clean-up and treatment materials and methods in which the treating materials have advantageous properties, such as higher capacity to absorb, retain, immobilize, etc. the hazardous material, such as HF, per unit mass of treatment material. The present invention satisfies these needs among others.

SUMMARY OF THE INVENTION

This invention is directed to novel compositions and methods, and to devices which use such compositions and methods, to treat hazardous spill conditions. As used herein, the term "treat" means to lessen or reduce the negative or harmful effects on the environment and/or living things of a dispersal of chemicals, usually in the form of an unintended spill of such materials. In certain preferred embodiments, the hazardous material comprises an acid-containing material. The treatment methods of the present invention in preferred embodiments may comprise one or more of the steps or effects of: neutralizing the dispersed material; solidifying the dispersed material; immobilizing the material; and/or reducing the evolution of harmful or unwanted gaseous forms from the spillage. It should be understood that each of the above steps/effects may act on only a portion of the spilled material, but in preferred embodiments the methods and compositions are delivered and provided in a manner such that one or more of the desired effects is achieved on a substantial portion, and even more preferably substantially all of the dispersed hazardous material.

In preferred embodiments, the compositions and methods of this invention are applied from a safe distance, thus allowing substantially all of the spill to be reacted, neutralized, immobilized and/or devolitized (at least partially but preferentially substantially entirely) with minimal harm to safety workers and others in the area of the spill.

The present inventors have found that the present methods can be carried out in preferred embodiments by contacting, and preferably substantially covering, at least a portion of the hazardous material which has been spilled, leaked or otherwise the subject of an unwanted dispersal, with one or more binding agents. As a result of the preferred contacting step of the present invention, a mass is created which comprises the hazardous material and the binding agent in a form that is substantially less hazardous than the material without the binding agent. For the purposes of convenience, but not necessarily by way of limitation, the mass comprising the binding agent and the hazardous material is sometimes referred to herein as the "treated mass." The preferred binding agents can be advantageously used to produce a treated mass having one or more of the advantageous characteristics, properties, and/or effects described hereinabove. Examples of binding agents believed to be generally adaptable for use in connection with the present invention are described in the following pending applications, each of which is assigned to the assignee of the present application: Application No. 60/943,026; and Application No. 60/943,033.

In certain preferred embodiments, the binding agent comprises, and preferably consists essentially of, one or more polyacrylate-polyacrylamide cross-linked copolymers in accordance with the teachings contained herein. The preferred cross-linked copolymers have a substantial ability, especially when used in accordance with the preferred method steps described herein, to achieve and provide a treated mass having the desirable properties, characteristics, effects and/or modes of operation described herein. For example, the preferred polyacrylate-polyacrylamide cross-linked copolymers of the present invention exhibit a much higher capacity for retaining acidic materials, such as hydrogen fluoride (HF), than many of the other materials which have been known for use in such applications. The surprisingly high capacity of these preferred binding agents is particularly advantageous in accordance with the present methods, compositions and devices. For example, the large capacity of the present materials means that the relative proportion of hazardous material (such as HF) to binding agent (e.g., copolymer) in the treated mass is high, which means that the amount of binding material (and potentially the cost thereof) that needs to be transported to the spill site is reduced. This in turn permits the site, in preferred embodiments, to be treated more quickly and more effectively than prior materials, resulting potentially in an important saving of health and the environment.

In addition, it has been found by the present inventors that intimate mixtures of polyacrylate-polyacrylamide cross-linked copolymers and acidic materials, particularly hydrogen fluoride, which preferably form as a result of the present methods and the use of the present devices in certain embodiments as disclosed herein, result in a treated mass in which the volatility of the hazardous material (such as hydrogen fluoride) is diminished. This treated mass is also preferably more viscous and has a greater surface tension as compared to the acidic material generally, thus hindering formation of an acidic material in a gaseous or fluid state, including an aerosol cloud. Therefore, the compositions, methods and devices of the present invention permit a dramatic reduction in the immediate harm that such a spill would otherwise create relative to many of the previously used methods. Moreover, the present invention in certain aspects can make the spill zone easier to clean up and/or remediate.

Accordingly, the present invention in one aspect provides a treatment material comprising a binding agent, which preferably comprises a cross-linked copolymer comprising acrylamide and acrylate, preferably in the form of a solid or a gel, and an agent to assist carrying the copolymer to the material causing the hazard. In certain preferred embodiments, the carrying agent comprises a propulsion agent, which is preferably intimately engaged with the copolymer and provides motive force to the binding agent to carry it to the hazardous material. Preferably in such embodiments the carrying agent is a gas that is relatively inert, stable, readily removed or dispersed, and which is not itself inherently harmful to the environment or to health. Examples of such carrying agents include pressurized nitrogen.

In certain highly preferred embodiments of the invention, the present treatment material comprises a cross-linked copolymer comprising acrylamide cross-linked with an acrylic acid salt, wherein such treatment material is preferably in the form of a solid or a gel.

BRIEF DESCRIPTION OF THE DRAWINGS

FIG. 1 is a schematic view, in axial longitudinal section, of one embodiment of a portable treatment device according to one embodiment of the invention.

FIG. 2 is a view of a detail of FIG. 1 on an enlarged scale.

Figure 3:
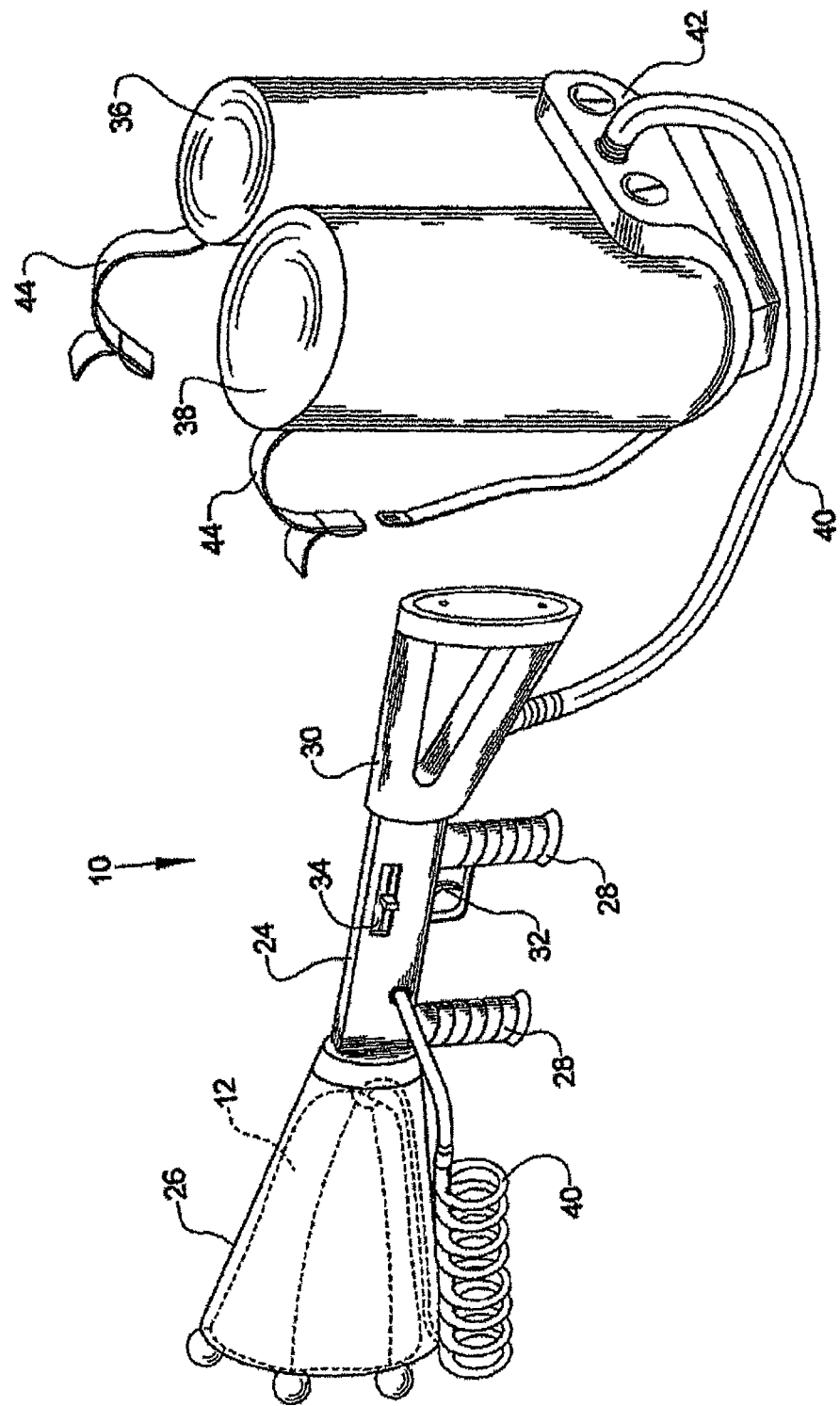
FIG. 3 is a perspective view of another embodiment of a portable treatment device of the present invention.

DESCRIPTION OF PREFERRED
EMBODIMENTS OF THE INVENTION

The Methods and Devices

Among the method aspects of the present invention, one embodiment includes the steps of providing a binding agent and applying the binding agent to at least a portion of the spill or otherwise unwanted dispersal of hazardous material. The binder providing step in certain embodiments comprises providing a source of the binding agent in its preferred form for use in treatment. In other embodiments, the binding agent may be provided in preferred forms as part of applying step. For example, in certain embodiments, the binding agent may be provided in the form of a solid block or sheet of binder which is not well adapted to direct application to the hazardous material. In such cases, the step of applying the binder may include the step of converting the block or solid sheet into a fine particulate form of the binder. This might occur in certain preferred embodiments, for example, in which an explosive or other high energy force is used to propel the binder material also first comminutes the block, film or sheet such that the binding agent is delivered to the site in the form of fine particles, powder and/or aerosol. Such embodiments may have advantages in certain applications relating to the portability of the material to the hazard site.

In preferred embodiments, the applying step results in contact between the binding agent and the hazardous material that is effective to form a treated mass that is less hazardous than the material prior to the contacting step. Although it is contemplated that the preferred contacting step forms a treated mass over a wide range of time periods, it is preferred that the time from initial contact to the point where such less hazardous treated mass is formed is not in excess of several hours, and more preferably is less than about 3 hours, and even more preferably less than about 1 hour. This time period will of course be a function of many parameters associated with each application, and all such time periods are within the scope of the present invention.

In certain preferred embodiments, the applying step comprises providing a carrying agent, such as a pressurized gas, and engaging the binding agent with the carrying agent such that the binding agent is propelled, for example by impulse discharge associated with a pressure differential, into contact with the hazardous material. The particular configuration of such devices may vary widely within the scope of the present invention, and all such configurations are within the scope hereof. It is contemplated, for example, that devices which have heretofore been used to effect sand blasting or other treatment by carrying an abrasive or other particulate material to a target site may be readily adapted for use in connection with the present invention. It is preferred, however, that the discharge velocity and/or pressure from such devices is controlled, or the impact of the discharge stream is otherwise limited, to ensure or at least minimize the extent to which the hazardous material is dispersed over a substantially greater area upon exposure to the delivery of the binding agent. The use of a net as described in detail hereinafter may serve the purpose, in addition to other purposes, of limiting the impact of the discharge stream to ensure or at least minimize the extent to which the hazardous material is dispersed over a substantially greater area.

In other embodiments, the applying step comprises providing a carrying agent that possesses a motive force produced by a chemical reaction, such as results, for example, from the reaction of an oxidizing agent and a solid fuel subsequent to ignition thereof. In many embodiments, such a carrying agent produced by such a reaction is in the form of an aerosol which carries the binding agent to the hazard site. Such an aerosol is sometimes referred to herein as a "pyrotechnically generated aerosol." The binding agent of the present invention can be incorporated in a canister or module of known type to effect delivery of the binding agent to the hazardous material. Such embodiments are particularly effective under circumstances in which the hazardous material is not exposed to changing environmental conditions, such as large changes in airflow or other weather changes.

In other embodiments, the applying step comprises providing a carrying agent in the form of a fabric or other matrix of fibers which carries or otherwise incorporates or is capable of carrying the binding agent and then delivering the fabric or other matrix of fibers to the hazardous material. For example, in such embodiments, the copolymer may be embedded in, coated on, and/or integrated in the form of fibers into a fabric, such as a web or mesh, which can be readily delivered to the hazardous material, preferably in certain embodiments by forming a blanket or curtain which can be deployed so as to cover or surround at least a portion of hazardous spill. In certain embodiments, such a deployment may involve forming such a mesh, web, curtain or similar article and propelling the material containing or carrying the copolymer so as to cover at least a portion of the area of the spill.

Many devices known to those in the art may be used to deliver the binding agent to the hazardous material, and all such devices are within the scope of the present invention. In certain preferred embodiments, the delivery device or system of the present invention includes at least one container and/or conduit for holding the carrying agent and/or the binding agent, and means for discharging the carrying agent and the binding agent from a location safely separated from the hazardous material so as to deliver the binding agent into contact with at least a portion of the hazardous material. In one embodiment, the preferred device comprises a fire extinguisher-type device in which at least the carrying agent is an inert gas stored or otherwise provided under pressure. In other cases, the carrying agent is generated in or by the device as a result of an explosive discharge.

One embodiment of a device which utilizes an explosive discharge which may be adapted for use in connection with the present invention in view of the teachings contained herein is illustrated in FIGS. 1 and 2. With reference initially to FIG. 1, a portable binding agent delivery device, generally indicated 1, comprises a handle 2 and an elongate tubular casing 3, having a distal end 3a and a proximal end 3b which is fixed to the handle 2. A chamber 4 is defined in the casing 3 for housing a charge 5 of a solid substance which can be transformed, at a predetermined temperature, into a carrying agent of the present invention, preferably in the form of an aerosol. In one embodiment, the charge 5 includes not only reactive components but also incorporates a binding agent of the present invention, preferably in small particulate form, distributed therein. The chemical and physical characteristics of the reactive components of the mass 5 are not relevant per se for the purposes of an understanding of the invention and will therefore not be described in detail herein, except to note that they are preferably selected such that the reaction conditions do not cause a deleterious change in the binding agent, that is, a change that would prevent the functioning of the binding agent. By way of one example that may be applicable for certain binding agents, the reactive components comprise a compacted mixture comprising potassium nitrate, a resin, and an organic oxidizing agent.

A sleeve-like portion 8 of a plug, generally indicated 9, is inserted in the opening 7. The plug 9, which is preferably made of plastics material, is held on the distal end of the tubular casing 3 by means of a peripheral rim 10 and by radial interference between the delivery opening 7 and the central sleeve-like portion 8. In this portion, a starting capsule, generally indicated 11, is held in an outer or front position, and an associated delay fuse 12 is held in a position immediately further in or to the rear, interposed between the capsule 11 and the charge 5. The starting capsule 11 includes a small inflammable charge 13 arranged closely in contact with the end portion 16a of a manually-operable activation element 16, for example, a metal wire, a cord, or the like, which the user can pull by gripping a gripping ring 15. The inflammable charge 13 is contained in a thin inverted cup-shaped container 17, the base of which has a central hole for the insertion of the cord 14. The plug 9 has a transverse wall 18 with a hole 19 aligned with the hole in the container 17. A protective cover 20 closes the distal end of the fire-extinguisher to protect the starting capsule 11 and its activation element 16. In preferred operation, the user opens the cover 20, grips the gripping ring 15 and pulls the cord 14 energetically in the direction indicated by the arrow A. The friction or other forces exerted by the activation element against the inflammable charge 13 brings about ignition thereof and the production of a flare which lights the fuse 12. The fuse, which preferably burns for a few seconds, gives the user time to move his hand away from the distal portion of the device before the carrying agent and binding agent are discharged. When the combustion, which is propagated along the fuse 12, reaches the reactive elements in mass 5, it triggers the exothermic chemical reaction thereof, with the production of an aerosol suspension of particles of extremely small particle size. The increase in pressure which accompanies the reaction causes the expulsion of the plug 9. The aerosol fluid produced by the combustion of the charge is discharged energetically from the opening 7 and can be directed towards the hazardous material from a safe distance.

In an alternative form of the device, the binding agent may be provided as a separate mass positioned to be jettisoned from the end of an elongated version of tubular casing 3. In such embodiments, the cord 14 may be passed through a small, sealed opening in a side wall of the casing, with binding agent located in the tube on the distal side of the charge 13. In such embodiments, the binding agent may be provided in particulate form, or the binding agent may be in a form that is frangible upon operation of the device so as to produce the desired size of binding particles. Alternatively, the device of FIGS. 1 and 2 may be modified to carry a fabric of the present invention packed in a distal portion of the casing so as to be ejected by the reactive forces in a manner designed to cover the desired area in which the hazardous material is located. Further, it should be appreciated that any combination of any two or more of these options may be incorporated into a device so, for example, both a binding agent impregnated net and an aerosol of binding agent particles are ejected upon operation of the device.

Figure 4:
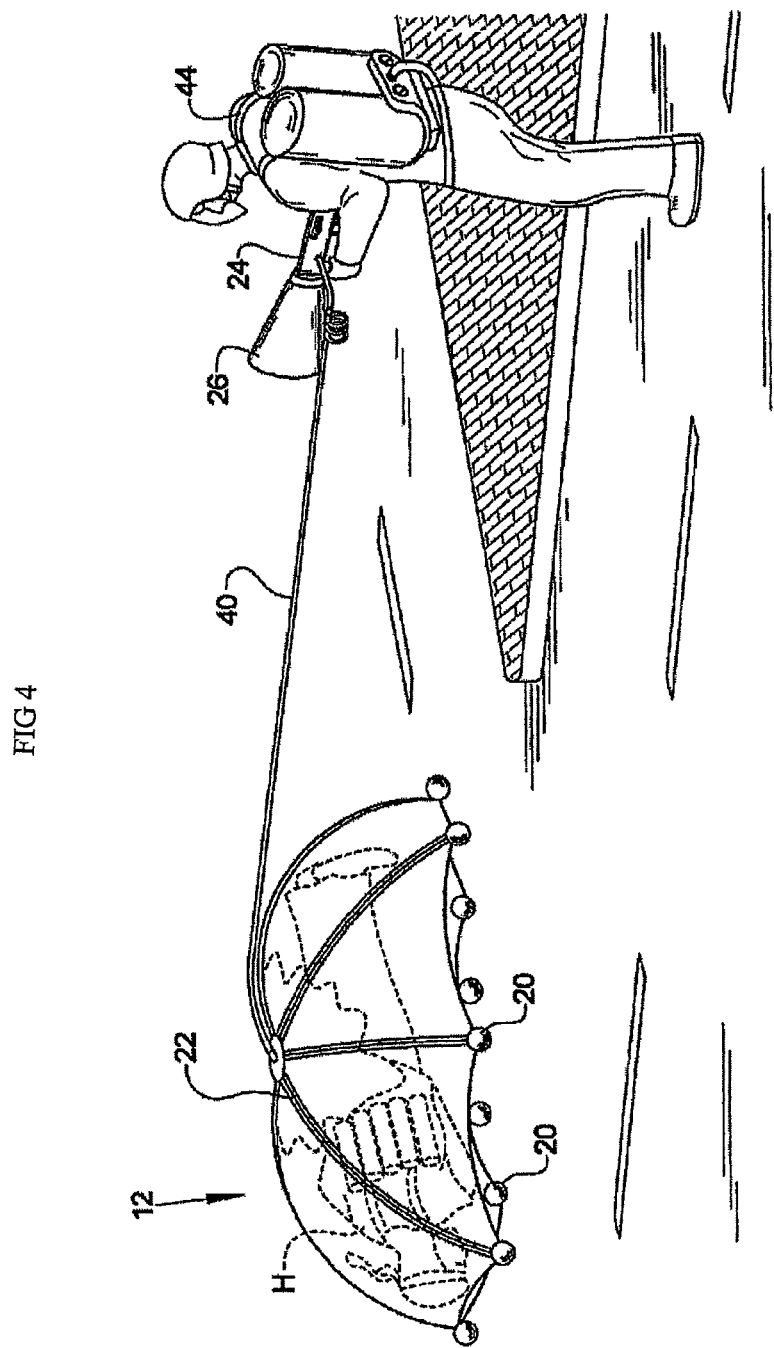
FIG. 4 is an environmental view of the treatment device after deployment at hazard spill.
Figure 5:
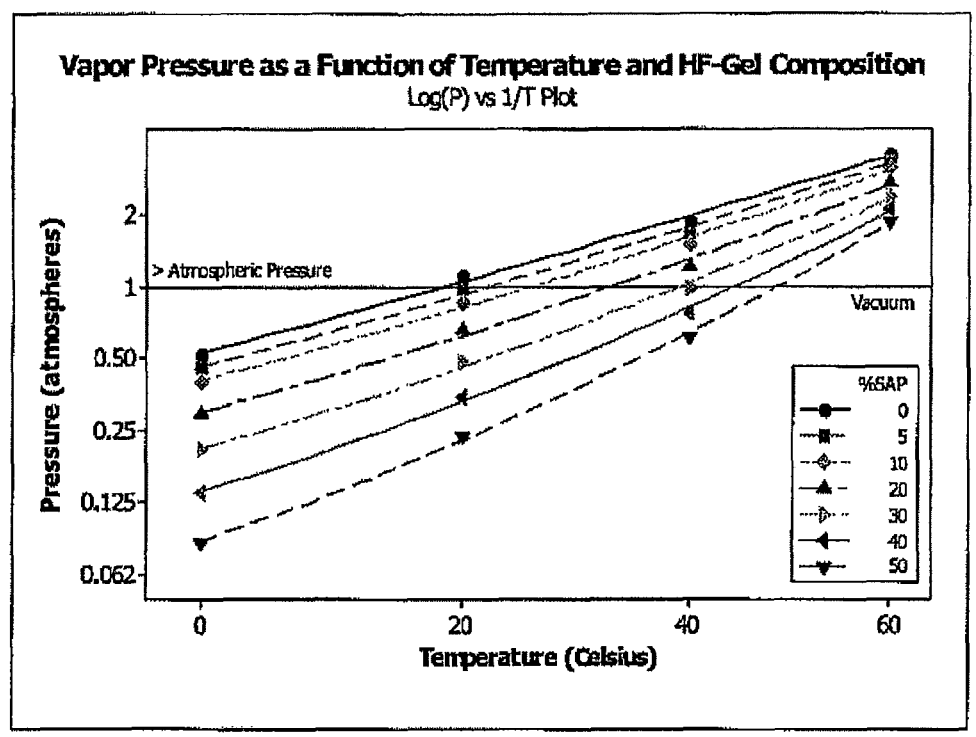
FIG. 5 is a graphical representation of vapor pressure as a function of temperature and HF-Gel composition.

Another embodiment which would permit the multiple modes of operation is disclosed in FIGS. 3 and 4. Referring now to the drawings, it is seen that the device preferably incorporates a treatment net of the present invention, generally denoted by reference numeral 10. In the preferred embodiment illustrated, the net 12 is generally round in shape and has a central point 14 and an outer periphery 16. It will be appreciated, however, that other shapes are adaptable for use in accordance with the present invention. The net 12 is manufactured from a fabric or mesh which incorporates a binding agent of the present invention. For embodiments in which the hazardous material also presents a danger of explosion, the net may preferably be formed of an explosion containment material, which material has a high tensile strength, such as aramid yarn (sold under the trademark KEVLAR and manufactured by the E.I. Du Pont de Nemours and Company), which is an organic yarn within the family of aromatic polyamides.

Although in certain embodiments the net 12 may be untethered to the device, in certain preferred embodiments the net is connected via a tether 40 (see FIG. 4) to the device 10. In the illustrated embodiment, the tether 40 is a tubular tether for purposes of delivering a separate flow of binding agent to the hazardous site as described herein below, although it will be appreciated that the tether need not perform this function in all embodiments. Likewise, it will be appreciated that the net need not be a carrying agent for binder in those embodiments in which the tether 40 is a tubular tether for delivering binding agent to the hazardous material. Nevertheless, it is generally preferred that the device incorporate both mechanisms for delivering binding agent.

In preferred embodiments, a nozzle 18 is located on the net 12 and may be located at the central point 14. Preferably a series of weights 20 are located on the net, preferably about the outer periphery 16 of the net. The device/system of this embodiment of the invention includes a gun 24 having a cone loader 26, appropriate hand grips 28, a butt stock 30 (if desired) and a trigger 32. Of course, the shape of the loader may be readily modified according to the shape of the net being used. In preferred embodiments, the gun is configured to have the loader readily replaceable so that the shape and size of the net may be selected upon arrival at the site to suit the circumstances of each hazard condition. A bayonet type arrangement may be used to make the loader readily replicable to suit size and shape needs. Screw-type mounting of the loader is also possible.

The gun may be pneumatically fired wherein a source of high pressure gas (not illustrated) provides the pneumatic force to fire the gun 24. This high pressure gas source may be either an external or internal canister or may be a small cartridge that is fed into the gun through the gun's chamber 34. Alternately, the gun 24 may be fired by a firing cartridge such as a standard firing blank.

A first tank 36 is provided and holds a carrying agent and/or binding agent. A second tank is also provided in certain embodiments for holding carrying agent and/or binder, or possibly other materials which may be desirable to deliver also the site of the hazardous material. The first tank 36 and the second tank 38 are fluid flow connected with the nozzle 18 on the net 12 via a conduit 40 which passes through the gun 24 so that the trigger 32 on the gun can control discharge of the contents of the two tanks 36 and 38. In preferred embodiments the two tanks 36 and 38 pass through a manifold 42 prior to entering the conduit 40. A section of the conduit 40 (the section that is disposed between the gun 24 and the nozzle 18) may be coiled for compactness of design. Carrying straps 44 may be provided for ease of carrying of the two tanks 36 and 38.

Preferably the manifold 42 is selectable so as to allow the carrying agent to be held in one tank and the binder to be held in another tank such that mixing of the two can occur in the manifold or in appropriately designed chambers of the gun. Of course, it is possible that in certain embodiments the carrying agent and binder are premixed and held together in one or both of the tanks. In other embodiments, the tanks may hold only binding agent and the carrying agent is supplied via nozzles 28.

In operation, the net 12 is folded appropriately and placed into the cone loader 26 of the gun 24 and the gun 24 is appropriately primed (either a firing cartridge is inserted into the firing chamber 32 or a supply of pressurized gas is provided for the gun). Once the user identifies an appropriate target for treatment, such as a spill of HF, the user squeezes the trigger 32 in order to fire the gun 24 which propels the net 12 at the target in order to drape the net 12 over the hazardous material, or at least a portion thereof. The weights 20 along the outer periphery of the net 12 help the net land appropriate about the target in order to effectively cover the target area. Continued squeezing of the trigger 32 causes operation of the carrying agent such that binding agent is discharged through the nozzle 18 onto the target being covered by the net 12. Of course this sequence of operation may be altered within the scope of the present invention.

In certain embodiments, the deployment means propels the binding agent with a force adequate to substantially disperse the binding agent throughout the hazardous liquid. That is, the binding agent is mixed with the hazardous liquid so as to rapidly and substantially form a less hazardous composition. In other embodiments, the deployment means propels the binding agent onto the surface of the hazardous liquid where it forms a protective layer over the liquid. In still other embodiments, the deployment means propels the binding agent onto the surface or into one or more discrete portions of the hazardous liquid from which it is subsequently mixed with the hazardous liquid. It will be appreciated that a device or method may comprise any combination of two or more of these and other deployment means.

In certain preferred embodiments of the invention, provided is a system for suppressing the spread of an acid-containing hazardous material, said system comprising: a container, preferably a portable container, having an interior portion and an exterior side, said interior portion being adapted to receive a propellant; a propellant in fluid communication with said interior portion; a nozzle, preferably a pivotal nozzle, disposed on said exterior portion and in fluid communication with said interior portion; and a binding agent disposed within said interior portion or said nozzle. Preferably, the binding agent in such embodiments comprises at least one cross-linked copolymer comprising acrylamide units and acrylate units in solid form, preferably pellets, powder, granules, fibers, or some combination thereof. Preferably, the propellant is disposed within the container and is a combustible fuel, a pressurized gas, or a compressed liquid, such as for example, nitrous oxide, carbon dioxide, air, noble gas, hydrofluoroalkane, hydrofluoroolefin, and combinations thereof.

The Compositions

In preferred embodiments, the hazardous material is contacted by a composition comprising a binding agent, such as an absorbent polymer or complexing agent, to form a treated material comprising at least a portion of the hazardous material, wherein the treated material is a solid, semisolid, or viscous liquid, and/or has a vapor pressure that is at or below ambient pressure, and/or has a high surface tension. In preferred embodiments, the acidic material, preferably HF, being treated is substantially unchanged in its chemical make-up from its untreated state and, thus, may be readily and quantitatively recovered from the treated material.

As used herein, the term "restraining" means to hold back or keep in check. Examples of restraining include, but are not limited to, immobilization and suppression of a propensity to volatilize and/or aerosolize.

As used herein, the term "immobilizing" means to impede movement.

As used herein, the term "hazardous" means a property or condition that imperils or otherwise adversely effects the safety or stability of a person, plant, animal, or the environment, or is a nuisance if unrestrained. Examples of hazardous materials include, but are not limited to, those that are flammable, corrosive, explosive, carcinogenic, toxic, mutagenic, odoriferous, radioactive, volatile, or otherwise chemically unstable.

As used herein, the term "binding agent" means a material having the capacity to exert or create a strong chemical or physiochemical attraction between two substances. Examples of strong chemical and physiochemical attractions include ionic bonding, nonionic bonding, electrophilicity, electrophobicity, and the like. Examples of binding agents include, but are not limited to, absorbent polymers, such as hydrogels, and complexing agents, such as ionic liquids.

Preferably, the binding agent is in a form that is easily and rapidly deployable into a liquid or onto the liquid's surface. Examples of easily and rapidly deployable forms include liquid and solids such as powder, granules, pellets, fibers, or combinations thereof.

In certain preferred embodiments, the composition binds the hazardous material in such a way as to readily release the hazardous material under certain conditions, such as changing the temperature and/or pressure of the composition. In such embodiments, the hazardous material may be recovered after it has been re-secured.

In certain embodiments, the carrying agent may comprise a compressed gas, such as air, nitrogen, carbon dioxide, or a noble gas instead of, or in addition to, an oxidizable fuel. For such embodiments, the compressed gas is rapidly released and propels the binding agent.

The choice of binding agent is primarily determined based upon the hazardous material held in the receptacle. Examples of hazardous materials that may be practiced with the present invention include, but are not limited to, nitric acid, concentrated sulphuric acid, concentrated hydrochloric acid, aqueous sodium cyanide, anhydrous sodium cyanide, aqueous hydrogen cyanide, anhydrous hydrogen cyanide, bromine, bromine trifluoride, ammonia, trifluorophosphine, titanium tetrachloride, oleum, chlorosulphonic acid, chlorine, fluorine, aqueous hydrogen fluoride, anhydrous hydrogen fluoride, phosgene, petroleum, and derivatives thereof. As used herein, the term "derivative" means a compound or chemical structure having the same fundamental structure, underlying chemical basis, or chemical properties as the relevant related compound. Such derivatives are not limited to, but may include, a compound or chemical structure produced or obtained from the relevant related compound.

In certain preferred embodiments, the binding agent is an absorbent material. Particularly preferred absorbent materials are absorbent polymers. Examples of absorbent polymers include, but are not limited to, polyacrylamide, polyalkylacrylamide, polyacrylate, polyalkylacrylate, polyacrylic acid salts, cross-linked polyacrylamide-polyacrylate copolymer, cellulose ethers, modified starches, starch derivatives, natural gum derivatives, ethylene oxide polymer, polyethyleneimine polymer, polyvinyl pyrrolidone polymer, and mixtures or copolymers thereof. Such binders are described, for example, in U.S. Pat. No. 4,383,868 and U.S. Pat. No. 6,177,058, each of which are incorporated herein by reference.

These absorbent polymers are particularly preferred for binding nitric acid, concentrated sulphuric acid, concentrated hydrochloric acid solution, aqueous sodium cyanide solution, bromine, titanium tetrachloride, oleum, chlorosulphonic acid and anhydrous hydrogen fluoride.

For binding anhydrous and aqueous hydrogen fluoride, polyacrylate-polyacrylamide cross-linked copolymers, particularly those derived from a polyacrylic acid salts, and mixtures of cross-linked polyacrylamide-polyacrylate copolymer and at least one of polyacrylamide, polyalkylacrylamide, polyacrylate, polyalkylacrylate, and polyacrylic acid salts.

In certain embodiments, the binding agent is a complexing agent. Preferred complexing agents include, but are not limited to, organic salts, particularly organic salts that form ionic liquids. Examples of preferred organic salts include, but are not limited to, salt comprising a cation selected from the group consisting tetraalkylphosphonium, tetraalkylammonium, pyridinium, N-alkylpyridinium, N,N'-dialkylimidazolium, and imidazolium. Particularly preferred organic salts is a substituted imidazolium chloride, with 1-methyl-3-ethylimidazolium chloride being more preferred. These organic salts are particularly useful for binding chlorine. Preferred compositions of these organic salts and chlorine have a vapor pressure that is lower than the ambient vapor pressure.

Other binding agents that may be practiced with the invention include polyacrylic acid which is useful for binding aqueous and anhydrous hydrogen cyanide and ammonia; calcium stearate which is useful for binding petroleum and petroleum-based compounds; and azolium tetrafluoroborate, which is useful in producing an electrolyte with bromine trifluoride and trifluorophosphine.

In certain preferred embodiments of the invention the binding agent comprises, and preferably comprises in major proportion and even more preferably consists essentially of at least one polyacrylate/polyacrylamide crossed-linked copolymer. As used herein, the term "copolymer" means a polymer having two or more different monomer residues that have been polymerized and constructed as one or more chains. The arrangements of these monomer units in the chain include those that regularly alternate the different monomers or those that repeat monomer units in regular or random sequences. In addition, the chain can be straight, branched, or grafted, or can exist as a block copolymer.

As used herein, the term "cross-linked" means the attachment of two chains of polymer molecules by bridges composed of an element, a functional group, a compound, or a polymer unit, which join certain atoms of the chains by primary chemical bonds. In certain embodiments, cross-linking occurs between two or more polymer chains to form a copolymer structure. In certain other embodiments, cross-linking occurs between two or more copolymer chains that are similar in arrangement. Preferably, cross-linking occurs between amide groups and carboxylic groups of the copolymer.

The cross-linked copolymer of the present invention in its dry form is preferably solid in the form of a powder, granules, pellets, and the like. When exposed to acidic material, particularly hydrogen fluoride, the copolymer chains expand or unfold and uptake or absorb the acidic material to form a solid or a semi-solid material, such a gel. Due to the copolymer's cross-linking, the copolymer is preferably insoluble in the acidic material, particularly hydrogen fluoride, and water.

Though not intending to be bound by a particular theory, it is believed that hydrogen fluoride uptake by the copolymer is facilitated by the negative carboxylic groups of the copolymer and their hydration with hydrogen fluoride molecules. For embodiments in which the copolymer comprises an alkali metal or ammonium ion (e.g., copolymers form with an acrylic acid salt), it is believed that, in the presence of hydrogen fluoride, the alkali metal or ammonium disassociates from the carbonyl group creating two ions: a carboxyl ($COO^-$) and an alkali metal or ammonium ion (e.g., $Na^+$). The carboxyl groups begin to repel each other because they have the same negative charge. This repulsion unfolds or swells the polymer chain. The swelling action also allows more hydrogen fluoride to associate with the polymer chain and reside in the spaces within the polymer's network.

The cross-linking between polymer chains prevents the copolymer from dissolving in liquid hydrogen fluoride or other liquids. When the chains become hydrated, the cross links prevent them from moving around randomly. In general, the cross-linking affects the copolymer's adsorption capacity, with more cross links in a chain corresponding to a decrease in the polymer's ability to adsorb liquids. (See, e.g., *Osmosis and Super Absorbent Polymers*, U. of Illinois at Urbana-Champaign.) However, the inventors have surprisingly found that cross-linked copolymers of the present invention have a significantly higher capacity for liquid hydrogen fluoride compared to the copolymer's constituent polymers individually.

Preferred cross-linked copolymers of the present invention are constructed of both acrylamide units and acrylate units. Within the scope of the term "acrylamide", included is acrylamide itself (i.e., 2-propenamide), polyacrylamides, polyalkylacrylamides (e.g., polymethylacrylamide), monomer residues of such acrylamides, and derivatives thereof. As used herein, the term "derivative" means a compound or chemical structure having the same fundamental structure or underlying chemical basis as the relevant related compound. Such a derivative is not limited to a compound or chemical structure produced or obtained from the relevant related compound. Acrylamide units that can be utilized in the present invention include individual structural units of acrylamide, repeating units of acrylamide, and polymer chains constructed, at least in part, of acrylamides.

Within the scope of the term "acrylate", included is acrylic acid (i.e., 2-propenoic acid), acrylic acid salt (e.g., sodium acrylate, potassium acrylate, and the like), alkylacrylates (e.g. methyl acrylate, butyl methylacrylate, and the like), polyacrylates, polyalkylacrylates, polyacrylic salts, monomer residues of such acrylates, and derivatives thereof. Acrylate units that can be utilized in the present invention include individual structural units of acrylates, repeating units of acrylates, and polymer chains constructed, at least in part, of acrylates.

Particularly preferred acrylic acid salts include potassium acrylate, sodium acrylate, and ammonium acrylate, with potassium acrylate being particularly preferred.

Polyacrylate-polyacrylamide cross-linked copolymers are commercially available from a variety of sources including Degussa AG of Krefeld, Germany (sold under the trade name STOCKOSORB®), Kyoritsu Yukikogyo Kenkyusho of Japan (sold under the trade name Hymosab® 200), and Aldrich of Milwaukee, Wis. (Cat. No. 43, 277-6).

Copolymers of the present invention preferably comprise from about 1 to about 99 weight percent, and more preferably from about 5 to about 60 weight percent, of acrylamide units based upon the total weight of the copolymer. Copolymers of the present invention also preferably comprise from about 1 to about 99 weight percent, and more preferably from about 5 to about 60 weight percent, of acrylate units based upon the total weight of the copolymer.

Generally, the cross-linked copolymers used in the invention have molecular weights of from about 5,000 to about 10,000,000. Preferably, cross-linked copolymers with molecular weights of from about 5,000 to about 5,000,000 are used.

The inventors have found that the cross-linked copolymers of the present invention have an exceptionally high capacity for hydrogen fluoride. It is possible to measure the capacity of a polymer for HF by mixing the polymer with an excess of HF, allowing the mixture to sit for a period of time such that the polymer becomes saturated, filtering off the excess HF, and weighing the saturated polymer as well as the excess HF.

Although cross-linked copolymer capacity is important to a practical HF-gel system, other properties should be considered as well. Other properties of interest include exotherm upon mixing the copolymer and HF, vapor pressure of the resulting composition, viscosity of the composition, gelatinization time, density/volume of the starting polymer, capacity of the composition under pressure, ease of recovery of the HF from the composition, reduction in HF aerosol formation by the system, and mixing or dispersing of the polymer into HF.

It is contemplated therefore, that in addition to polyacrylate/polyacrylamide crossed-linked copolymers, other HF-absorbing polymers and copolymers may be practiced with the present invention. Preferably, these other polymers and copolymers will be mixed with the polyacrylate/polyacrylamide crossed-linked copolymer to optimize several properties of the composition. For example, for applications in which the time required to gel a given quantity of HF is important, the invention involves a mixture a copolymer having high HF capacity and another polymer or copolymer which gels quickly. The evolution of excessive heat may accompany the formation of the gel when HF and a copolymer or polymer are mixed. Accordingly, certain embodiments of the invention utilize a mixture of a high capacity cross-linked copolymer and a polymer or copolymer with a lower capacity that exhibits a smaller exotherm.

Examples of other polymers that may be mixed with a polyacrylate/polyacrylamide crossed-linked copolymer include those described in U.S. Pat. No. 6,177,058, which is incorporated herein by reference. Preferred polymers include water soluble polymers selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer and mixtures thereof.

Without departing from the scope of the invention, it will be recognized that other components also may be included in the binder compositions of this invention. The specific nature of these components will depend on the desired end use of the compositions.

Preferably hydrogen fluoride may be recovered readily from the treated material by exposing the treated material to conditions effective to liberate hydrogen fluoride vapors. One means of liberating hydrogen fluoride vapor is by heating the composition at elevated temperatures, generally from about 0 to about 200° C., preferably from about 80 to about 150° C., resulting in the liberation of hydrogen fluoride vapor. The vapor may then be condensed by any convenient means. Alternatively, the hydrogen fluoride may be liberated by decreasing the pressure over the composition or increasing both the pressure and temperature and then condensing the vapors. This alternative means for recovering hydrogen fluoride may be accomplished at pressures of from about 60 to about 1 psia and temperatures of from about 20 to about 50° C. As yet another alternative, hydrogen fluoride value may be recovered from the treated compositions by use of the compositions in any of the wide variety of processes that use hydrogen fluoride.

EXAMPLES

The invention will be clarified further by a consideration of the following examples that are intended to be purely exemplary.

Example 1

Approximately, 0.5 grams of Stockosorb M (acrylamide/potassium acrylate copolymer, cross-linked), commercially available from Degussa AG, of Krefeld, Germany, was placed into a perfluoroalkoxy (PFA) vessel fitted with a screen above the polymer, and evacuated. The PFA vessel was then weighed, and cooled to about −78° C. About 29 grams of anhydrous HF were distilled onto the polymer. The PFA vessel was warmed to room temperature and weighed. After about two hours, the PFA vessel was inverted and the excess HF drained into a second, evacuated PFA vessel. The HF-polymer gel remained on the filter screen in the first PFA vessel. The vessel containing the polymer gel was again weighed and the polymer found to have absorbed about 45.6 grams of HF per gram of polymer. This experiment was repeated several times and the average capacity was found to be about 45.2 grams of anhydrous HF per gram of polymer, which is reported in Table 1.

Examples 2-4

The procedure in Example 1 was repeated for Examples 2-4, except that Stockosorb M was substituted for Stockosorb CW, FW, and SW, respectively. The results for each composition are reported in Table 1.

Example 5

The procedure in example 1 was hard to perform with small particle sized polymers and had unacceptable scatter in the results, so a different approach was taken to characterize their capacity. Approximately 0.5 grams of Stockosorb CW was placed in a PFA vessel, connected to a vessel containing HF, and the system was evacuated. The valve of the HF container was opened and the polymer allowed to absorb HF vapor for two days. At the end of this period the polymer had adsorbed 37.62 grams of HF/gram of polymer. The experiment was repeated with fresh polymer which was allowed to absorb HF vapor for about 4 days. At the end of this period the polymer had adsorbed 40.90 grams of anhydrous HF per gram of polymer. The average of these two measurements is reported in Table 1. Although this technique is different than the approach described in example 1, it shows the polymer absorbs much more HF than previously reported systems.

Example 6

The procedure in example 2 was repeated with Stockosorb FW. The average of multiple runs for each composition is reported in Table 1.

Comparative Examples 7-15

The procedure in example 1 was repeated, except with the polymers listed Table 1. The HF capacities of these polymers is summarized in Table 1. The test results show that acrylamide/potassium acrylate cross-linked copolymers have a much higher HF capacity compared to acrylate polymers.

Example 16

A small amount of Stockosorb M was placed into a previously weighed FEP vessel. The vessel was evacuated and weighed again to determine the weight of polymer (0.1111 grams). The sample was then reconnected to the metal vacuum line, cooled to −78° C. and an excess of HF distilled onto the polymer. The weight of the vessel+polymer+HF was then obtained. The vapor pressure of this system was measured at 20° C. A small amount of HF was then distilled from the vessel and the weight of the vessel+polymer+HF was then obtained. The vapor pressure of this reduced HF system was again measured at 20° C. This procedure was repeated multiple times until nearly all of the HF had been removed. This experiment was run in triplicate, the vapor pressures were then calculated at several standard compositions and plotted in FIG. 1. The results demonstrate the low vapor pressure of the composition.

Example 17

Example 16 was repeated at 0° C. The results are shown in FIG. 1.

Example 18

Example 16 was repeated at 40° C. The results are shown in FIG. 1.

Example 19

Example 16 was repeated at 60° C. The results are shown in FIG. 1.

Example 20

About 8 grams of Stockosorb M was quickly added to a cylinder containing about 180 grams of HF at 20° C. In about 160 seconds the HF was about 65% gelled based on the height of the expanding polymer in the cylinder. Shortly afterward, the HF was completely gelled. The temperature of the cylinder contents reached 29° C. before cooling to 20° C. This test demonstrates the rapid uptake of HF by the copolymer.

Example 21

Approximately, 0.49 grams of Stockosorb M (acrylamide/potassium acrylate copolymer, cross-linked), commercially available from Degussa AG, of Krefeld, Germany, was placed into a perfluoroalkoxy (PFA) vessel fitted with a screen above the polymer, and evacuated. About 78.8 grams of aqueous HF (49 wt %) transferred onto the polymer. The PFA vessel was weighed. After about two hours, the PFA vessel was inverted and the excess HF drained into a second, evacuated PFA vessel. The HF-polymer gel remained on the filter screen in the first PFA vessel. The vessel containing the polymer gel was again weighed and the polymer found to have absorbed about 72.5 grams of aqueous HF per gram of polymer.

Comparative Example 22

About 150 grams of water was added to 0.5 grams of Stockosorb M and allowed to sit for about 2 hours. The mixture was then filtered. Based on the weight increase, the polymer absorbed about 254 grams of water per gram of polymer.

Comparative Example 23

About 165 grams of deionized water was added to 0.58 grams of poly(acrylic acid) partial sodium salt from Aldrich, mixed, and filtered as in comparative example 14. The polymer absorbed about 231 grams of water per gram of polymer. The Stockabsorb M therefore absorbed about 10% more water than this Aldrich polymer. Based on these water examples the two polymers have very similar absorbent capacities for water. It is therefore completely unexpected that the Stockosorb absorbs about 22 times more HF than the Aldrich polymer (Table 1).

Example 24

Polymer A, which quickly absorbs HF will be mixed with polymer B which absorbs HF more slowly, but yields a gel with a lower vapor pressure than polymer A. This polymer mixture will then be added to HF. The resulting gel will form quickly and will have an acceptably lower vapor pressure and reduced tendency to form HF aerosol droplets.

Example 25

Polymer C, which quickly absorbs HF, will be mixed with polymer D which absorbs HF more slowly, but has a higher capacity for absorbing HF. This polymer mixture will then be added to HF. The resulting gel will form quickly and will have an acceptably high capacity for HF.

Example 26

Polymer A, B, and D will be mixed and then added to HF. The resulting gel will form quickly, will have a good capacity for absorbing HF, an acceptably low vapor pressure, and a reduced tendency to form HF aerosol droplets.

Example 27

An empty dry chemical-type fire extinguisher canister equipped with a nozzle and a triggering mechanism will be provided. The canister will be partially filled with binder comprising a cross-linked copolymer comprising acrylamide units and acrylate units. The canister will then be pressurized using a compressed gas.

Liquid hydrogen fluoride will be poured into shallow pan. The nozzle of the canister will be directed to the hydrogen fluoride and the triggering mechanism activated. The binder will then be released from the canister and propelled into contact with the hydrogen fluoride. Upon contacting the hydrogen fluoride, the binder will start to form a gelatinous material comprising the copolymer and the hydrogen fluoride. Within minutes, substantially all of the hydrogen fluoride will be immobilized within the gelatinous material.

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A system capable of treating hydrogen fluoride-containing hazardous material, said system comprising: binding agent; carrying agent for carrying said binding agent to the area of the hazardous material, said carrying agent comprising a fabric carrying or made from said binding agent; a discharge chute capable of holding said fabric; and means for propelling said fabric to the site of the hazardous material from a safe distance therefrom such that the fabric comes in contact with at least a portion of said hazardous material and wherein said binding agent reduces the risk from said hazardous material, and wherein said binding agent comprising a cross-linked copolymer comprising acrylamide units and acrylate units.

2. The system of claim 1 wherein said discharge chute is connected to a gun which carries said propelling means.

3. The system of claim 1 wherein said system further comprises at least a first tank containing at least a portion of said

TABLE 1

| Ex. No. | Polymer Capacity (grams HF/gram polymer) | Avg. Value | Avg. Value (vapor expt) |
|---|---|---|---|
| 1 | Stockosorb ® M (polyacrylate-polyacrylamide cross-linked copolymer) | 45.20 | |
| 2/5 | Stockosorb ® CW (polyacrylate-polyacrylamide cross-linked copolymer) | 52.72 | 39.26 |
| 3/6 | Stockosorb ® FW (polyacrylate-polyacrylamide cross-linked copolymer) | 75.42 | 27.14 |
| 4 | Stockosorb ® SW (polyacrylate-polyacrylamide cross-linked copolymer) | 57.56 | |
| 7 | AQUAKEEP ® (sodium polyacrylate) | 3.50 | |
| 8 | Luquasorb ® 1030 (sodium polyacrylate) | 2.50 | |
| '9 | Luquasorb ® 1270 (potassium polyacrylate) | 1.70 | |
| 10 | Luquasorb ® 1210 (sodium polyacrylate) | 2.30 | |
| 11 | AP73 (cross-linked sodium polyacrylate) | 1.50 | |
| 12 | Aldrich ® Na$^+$ salt (sodium polyacrylate) | 1.90 | |
| 13 | Aldrich ® K$^+$ salt (potassium polyacrylate) | 1.92 | |
| 14 | AP80HS (sodium polyacrylate) | 2.52 | |
| 15 | SXM 70 (salt of polyacrylic acid) | 1.83 | | binding agent and means to propelling binding agent from said tank to the site of the hazardous material from a safe distance therefrom.

4. The system of claim 1, wherein the fabric comprises a net.

5. The system of claim 4, wherein the net is generally round, the net having a central point and an outer periphery.

6. The system of claim 4, wherein the net further comprises an aramid yarn.

7. The system of claim 4, wherein the net comprises an explosion containment material.

8. The system of claim 3, further comprising a nozzle attached to the fabric, the nozzle fluidly connected to the first tank.

9. The system of claim 1, wherein the copolymer comprises from about 1 to about 99 weight percent acrylamide units and about 1 to about 99 weight percent acrylate units, based upon the total weight of the copolymer.

10. The system of claim 1, wherein the copolymer comprises from about 5 to about 60 weight percent acrylamide units and about 5 to about 60 weight percent acrylate units, based upon the total weight of the copolymer.

11. The system of claim 1, wherein the copolymer has a molecular-weight from about 5,000 to about 10,000,000.

12. The system of claim 1, wherein the copolymer has a molecular-weight from about 5,000 to about 5,000,000.

* * * * *